(12) United States Patent
Hashimoto et al.

(10) Patent No.: US 10,761,540 B2
(45) Date of Patent: Sep. 1, 2020

(54) AUTONOMOUS DRIVING SYSTEM (71) Applicant: Toyota Jidosha Kabushiki Kaisha, Toyota-shi Aichi-ken (JP)

(72) Inventors: Ryuta Hashimoto, Susono (JP); Yoshinori Watanabe, Isehara (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 291 days.

(21) Appl. No.: 15/824,674

(22) Filed: Nov. 28, 2017

(65) Prior Publication Data
US 2018/0181138 A1 Jun. 28, 2018

(30) Foreign Application Priority Data

Dec. 22, 2016 (JP) ................................. 2016-249578

(51) Int. Cl.
G05D 1/02 (2020.01)
G05D 1/00 (2006.01)
G08G 1/0967 (2006.01)
G06K 9/00 (2006.01)

(52) U.S. Cl.
CPC ......... *G05D 1/0246* (2013.01); *G05D 1/0088* (2013.01); *G06K 9/00798* (2013.01); *G06K 9/00825* (2013.01); *G08G 1/0967* (2013.01); *G08G 1/096725* (2013.01); *G05D 2201/0213* (2013.01)

(58) Field of Classification Search
CPC combination set(s) only.
See application file for complete search history.

(56) References Cited

U.S. PATENT DOCUMENTS

| 2005/0073431 A1* | 4/2005 | Moisel ................. B60R 1/00 340/901 |
| 2016/0091896 A1 | 3/2016 | Maruyama |
| 2018/0023972 A1* | 1/2018 | Lei ..................... H04W 4/80 701/467 |

FOREIGN PATENT DOCUMENTS

| JP | 2012-123606 A | 6/2012 |
| JP | 2013-544695 A | 12/2013 |
| JP | 2016-060336 A | 4/2016 |
| JP | 2016-071513 A | 5/2016 |
| WO | 2012/047743 A2 | 4/2012 |

\* cited by examiner

Primary Examiner — Rami Khatib
(74) Attorney, Agent, or Firm — Dinsmore & Shohl LLP (57) ABSTRACT An autonomous driving system has: an information acquisition device configured to acquire driving environment information indicating driving environment for a vehicle; and an autonomous driving control device configured to control autonomous driving of the vehicle based on the driving environment information. A forward event is an event that exists in front of the vehicle and causes the autonomous driving control device to change a travel state of the vehicle. The autonomous driving control device performs: event detection processing that detects the forward event based on the driving environment information; visually-recognizing timing estimation processing that estimates a visually-recognizing timing at which a driver of the vehicle is able to visually-recognize the forward event; and travel control processing that proposes or executes, at or after the visually-recognizing timing, travel control that changes the travel state according to the forward event.

11 Claims, 11 Drawing Sheets

| TYPE OF FORWARD EVENT | CONCRETE EXAMPLES | SOURCE INFORMATION |
|---|---|---|
| CHANGE IN TRAFFIC RULE | ·LIFTING OF PROHIBITION ON LANE CHANGE<br><br>·CHANGE IN SPEED LIMIT | TRAFFIC RULE INFORMATION |
| EVENT REQUIRING LANE CHANGE | ·CHANGE IN LANE ATTRIBUTE<br>·LANE INCREASE<br>·LANE DECREASE<br>·LANE BRANCHING<br>·LANE MERGING | LANE INFORMATION |
| EVENT TO BE AVOIDED | ·ROADWORK SECTION<br>·ACCIDENT VEHICLE<br>·OBSTACLE | DELIVERY INFORMATION |

| EXAMPLES OF DELAY MAP | |
|---|---|
| INPUT PARAMETER | DELAY TENDENCY |
| NUMBER OF SURROUNDING VEHICLES | · LARGER NUMBER OF VEHICLES → LARGER DELAY<br><br>· SMALLER NUMBER OF VEHICLES → SMALLER DELAY |
| NUMBER OF TRAFFIC SIGNS | · LARGER NUMBER OF TRAFFIC SIGNS → LARGER DELAY<br><br>· SMALLER NUMBER OF TRAFFIC SIGNS → SMALLER DELAY |
| VISIBILITY OF LANE MARKING | · LOWER VISIBILITY → LARGER DELAY<br><br>· HIGHER VISIBILITY → SMALLER DELAY |
| WEATHER | · RAIN (LOWER VISIBILITY) → LARGER DELAY<br><br>· FINE (HIGHER VISIBILITY) → SMALLER DELAY |
| HOUR | · NIGHT (LOWER VISIBILITY) → LARGER DELAY<br><br>· DAY (HIGHER VISIBILITY) → SMALLER DELAY |
| ABNORMAL EVENT | · ANY ABNORMAL EVENT → LARGER DELAY<br><br>· NO ABNORMAL EVENT → SMALLER DELAY |

*Fig. 10*

| EXAMPLES OF DELAY MAP ||
|---|---|
| INPUT PARAMETER | DELAY TENDENCY |
| FRONT GAZE TIME | · SHORTER TIME → LARGER DELAY<br>· LONGER TIME → SMALLER DELAY |
| OPERATION ELAPSED TIME | · LONGER TIME → LARGER DELAY<br>· SHORTER TIME → SMALLER DELAY |
| AGE | · OLDER AGE → LARGER DELAY<br>· YOUNGER AGE → SMALLER DELAY |
| DRIVING EXPERIENCE | · SHORTER EXPERIENCE → LARGER DELAY<br>· LONGER EXPERIENCE → SMALLER DELAY |
| DRIVER'S SETTING | · PREFERENCE TO LEEWAY → LARGER DELAY<br>· PREFERENCE TO QUICKNESS → SMALLER DELAY |

*Fig. 11*

AUTONOMOUS DRIVING SYSTEM

CROSS-REFERENCE TO RELATED APPLICATIONS

This application claims priority to Japanese Patent Application No. 2016-249578 filed on Dec. 22, 2016, which is incorporated herein by reference in its entirety include the specification, drawings and abstract.

BACKGROUND

Technical Field

The present disclosure relates to an autonomous driving technique for a vehicle. In particular, the present disclosure relates to proposal and execution of travel control by an autonomous driving system.

Background Art

Patent Literature 1 discloses a technique regarding zone driving by an autonomous driving system. In the technique, a roadgraph includes a zone associated with a particular rule. When a vehicle approaches the zone, the autonomous driving system alerts a driver that the vehicle is approaching the zone, and requires the driver to take control (steering, acceleration, deceleration, and the like) according to the particular rule.

LIST OF RELATED ART

Patent Literature 1: Japanese Translation of PCT International Application Publication No. JP-2013-544695

SUMMARY

The autonomous driving system disclosed in Patent Literature 1 makes a request to the driver when the vehicle approaches a zone. Here, the autonomous driving system detects approach to the zone by referring to information of the roadgraph. Therefore, the autonomous driving system can detect approach to the zone earlier than the driver. In this case, there is a possibility that the autonomous driving system makes a request to the driver at a timing before the driver recognizes the zone. When a request is made at such the early timing, the driver who has not yet recognized the zone feels senses of strangeness and anxiety.

To further generalize the above viewpoint, the followings can be said. That is, the driver (human) and the autonomous driving system are different in all of an amount of information, speeds of recognition and judgement. As compared with the driver, the autonomous driving system has more information and can recognize and judge faster. Therefore, even when the autonomous driving system recognizes an event existing in front of the vehicle, it is highly probable that the driver has not yet recognized the event. Moreover, even when the autonomous driving system proposes or executes travel control addressing the event, it is highly probable that the driver has not yet reached a stage of being able to judge necessity of the travel control. Therefore, if the travel control is proposed or executed at a timing determined by the autonomous driving system, the driver feels senses of strangeness and anxiety. This causes decrease in confidence m the autonomous driving system.

An object of the present disclosure is to provide a technique that can reduce driver's senses of strangeness and anxiety when an autonomous driving system proposes or executes travel control.

A first aspect of the present disclosure provides an autonomous driving system.

The autonomous driving system includes:

an information acquisition device configured to acquire driving environment information indicating driving environment for a vehicle; and an autonomous driving control device configured to control autonomous driving of the vehicle based on the driving environment information.

A forward event is an event that exists in front of the vehicle and causes the autonomous driving control device to change a travel state of the vehicle.

The autonomous driving control device performs:

event detection processing that detects the forward event based on the driving environment information;

visually-recognizing timing estimation processing that estimates a visually-recognizing timing at which a driver of the vehicle is able to visually-recognize the forward event; and travel control processing that proposes or executes, at or after the visually-recognizing timing, travel control that changes the travel state according to the forward event.

A second aspect of the present disclosure further has the following features in addition to the first aspect of the present disclosure.

The driving environment information includes traffic rule information indicating a traffic rule in relation to a position.

The forward event includes change in the traffic rule that is detected based on the traffic rule information.

A third aspect of the present disclosure further has the following features in addition to the first or second aspect of the present disclosure.

The driving environment information includes lane information regarding lanes on a map.

The forward event includes at least one of change in lane attribute, lane increase, lane decrease, lane merging, and lane branching that are detected based on the lane information.

A fourth aspect of the present disclosure further has the following features in addition to any one of the first to third aspects of the present disclosure.

The driving environment information includes delivery information delivered from a system external to the vehicle.

The forward event includes at least one of a roadwork section, an accident vehicle, and an obstacle that are detected based on the delivery information.

A fifth aspect of the present disclosure further has the following features in addition to any one of the first to fourth aspects of the present disclosure.

The information acquisition device includes a camera that images a situation around the vehicle.

The driving environment information includes image information imaged by the camera.

The visually-recognizing timing estimation processing includes:

processing that recognizes, based on the image information, an item indicating the forward event; and processing that regards a first timing when the item is recognized or a timing after the first timing as the visually-recognizing timing.

A sixth aspect of the present disclosure further has the following features in addition to the fifth aspect of the present disclosure.

The visually-recognizing timing is after the first timing by a certain period of time.

A seventh aspect of the present disclosure further has the following features in addition to the fifth aspect of the present disclosure.

The visually-recognizing timing is after the first timing by a delay time.

The autonomous driving control device variably sets the delay time according to the driving environment.

An eighth aspect of the present disclosure further has the following features in addition to the seventh aspect of the present disclosure.

The driving environment includes a number of surrounding vehicles.

The delay time increases as the number of surrounding vehicles becomes larger.

A ninth aspect of the present disclosure further has the following features in addition to the seventh aspect of the present disclosure.

The driving environment includes visibility that depends on weather or hour.

The delay time increases as the visibility becomes lower.

When detecting a forward event beforehand, the autonomous driving system according to the present disclosure estimates the visually-recognizing timing at which the driver is able to visually-recognize the forward event. Then, at or after the estimated visually-recognizing timing, the autonomous driving system proposes or executes travel control that changes the travel state according to the forward event. It is thus possible to reduce driver's senses of strangeness and anxiety. This contributes to increase in confidence in the autonomous driving system.

EMBODIMENTS

Embodiments of the present disclosure will be described below with reference to the attached drawings.

1. Outline

Figure 1:
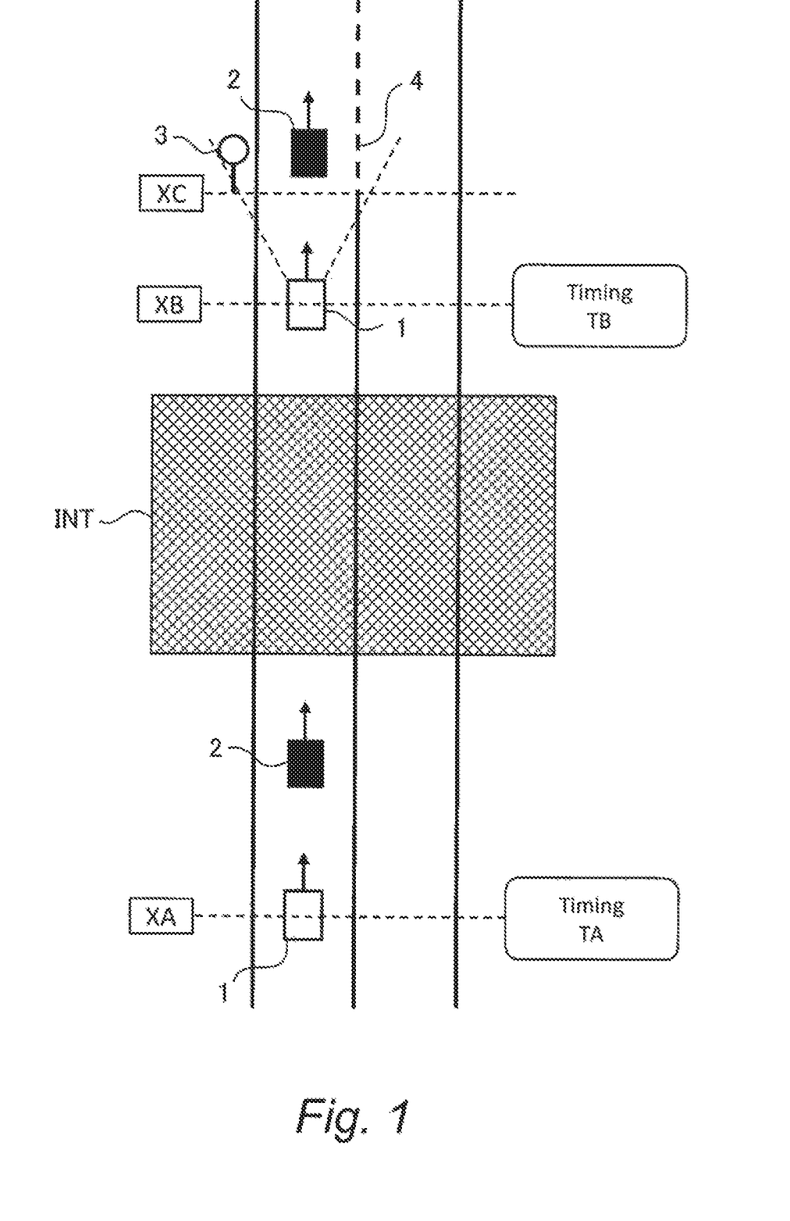
FIG. 1 is a conceptual diagram for explaining an outline of an autonomous driving system according to an embodiment of the present disclosure.

FIG. 1 is a conceptual diagram for explaining an outline of an autonomous driving system according to the present embodiment. The autonomous driving system is mounted on a vehicle 1 and controls autonomous driving of the vehicle 1.

In the example shown in FIG. 1, the vehicle 1 is traveling at a position XA at a certain timing TA. A preceding vehicle 2 exists in front of the vehicle. However, lane change (overtaking) is prohibited at the position XA. At a position XC ahead of the position XA, a traffic rule changes and the prohibition on lane change is lifted. Here, let us consider a case where a driver of the vehicle 1 at the position XA is not able to visually-recognize the change in traffic rule at the position XC. For example, an interrupting structure INT that interrupts the driver's view exists between the position XA and the position XC. The interrupting structure INT is exemplified by a curve, a tunnel, an ascending slope, a preceding vehicle, structures, and the like.

Meanwhile, even at the position XA, the autonomous driving system can often detect (recognize) the change in traffic rule at the position XC ahead. For example, the autonomous driving system can acquire information on lanes and the traffic rule in front of the vehicle 1 and beforehand detect the change in traffic rule at the position XC based on the information. When detecting the change in traffic rule, the autonomous driving system can give the driver a proposal of travel control according to the change. In the example shown in FIG. 1, the autonomous driving system is able to propose, at a stage of the timing TA (i.e. the position XA), "overtaking the preceding vehicle 2 ahead".

However, at the stage of the timing TA, the driver of the vehicle 1 has not yet recognized the change in traffic ride at the position XC ahead. Therefore, even when "overtaking" is proposed at the timing TA, the driver cannot judge its appropriateness. The driver feels senses of strangeness and anxiety against such the too early proposal by the autonomous driving system. This causes decrease in confidence in the autonomous driving system.

In view of the above, the autonomous driving system according to the present embodiment considers a timing at which the driver is able to "visually-recognize" the change in traffic rule at the position XC ahead. In the example shown in FIG. 1, the vehicle 1 moves past the interrupting structure INT and then arrives at a position XB before the position XC at the timing TB. At the position XB, the driver of the vehicle 1 is able to visually-recognize a traffic sign 3 indicating the change in traffic rule or change in a lane marking 4. That is, at the timing TB, the driver is able to visually-recognize the change in traffic rule. Such the timing TB is hereinafter referred to as a "visually-recognizing timing TB".

In the example shown in FIG. 1, the autonomous driving system estimates the visually-recognizing timing TB at which the driver is able to visually-recognize the traffic sign 3 or the change in the lane marking 4. Then, at or after the estimated visually-recognizing timing TB, the autonomous driving system gives a proposal of "overtaking". In other words, the autonomous driving system refrains from giving a proposal of "overtaking" until the estimated visually-recognizing timing TB. Accordingly, it is possible to suppress that the driver feels senses of strangeness and anxiety against the proposal by the autonomous driving system. The driver feels appropriateness for the proposal by the autonomous driving system. As a result, the driver's confidence in the autonomous driving system increases.

It should be noted that the example shown in FIG. 1 is just one example. The above-described concept can be applied not only to the "change in traffic rule" but also to other events. For example, when there is "lane decrease" in front of the vehicle 1, the autonomous driving system may beforehand detect the "lane decrease" and propose or execute lane change. As another example, when there is a "roadwork section" in front of the vehicle 1, the autonomous driving system may beforehand detect the "roadwork section" and propose or execute lane change. In any case, it is possible to reduce the driver's senses of strangeness and anxiety by refraining from proposing or executing lane change until the visually-recognizing timing TB.

Moreover, what the autonomous driving system proposes or executes is not limited to lane change. For example, let us consider a case where a speed limit changes in front of the vehicle 1. In this case, the autonomous driving system may beforehand detect the "change in speed limit" and propose acceleration or deceleration. It is also considered that the autonomous driving system executes blinker flashing as a preliminary action of lane change.

To generalize the above viewpoint, when detecting an event existing in front of the vehicle 1, the autonomous driving system plans to perform travel control according to the detected event. Here, the "travel control" is control to change a travel state of the vehicle 1, and includes steering control, acceleration control, deceleration control, and blinker flashing. The event that exists in front of the vehicle 1 and causes the autonomous driving system to perform the travel control is hereinafter referred to as a "forward event". As the forward event, not only "lifting of prohibition on lane change", "change in speed limit", "lane decrease", and "roadwork section" described above but also various examples can be considered. Various examples of the forward event will be described later in detail.

The concept according to the present embodiment can be summarized as follows. That is, the driver (human) and the autonomous driving system are different in all of the amount of information, speeds of recognition and judgement. As compared with the driver, the autonomous driving system has more information and can recognize and judge faster. Taking such the difference into consideration, when detecting a forward event beforehand, the autonomous driving system according to the present embodiment estimates the visually-recognizing timing TB at which the driver is able to visually-recognize the forward event. Then, at or after the estimated visually-recognizing timing TB, the autonomous driving system proposes or executes travel control that changes the travel state according to the forward event. It is thus possible to reduce the driver's senses of strangeness and anxiety. This contributes to increase in confidence in the autonomous driving system.

Hereinafter, the autonomous driving system according to the present embodiment will be described in more detail.

2. Configuration Example of Autonomous Driving System

Figure 2:
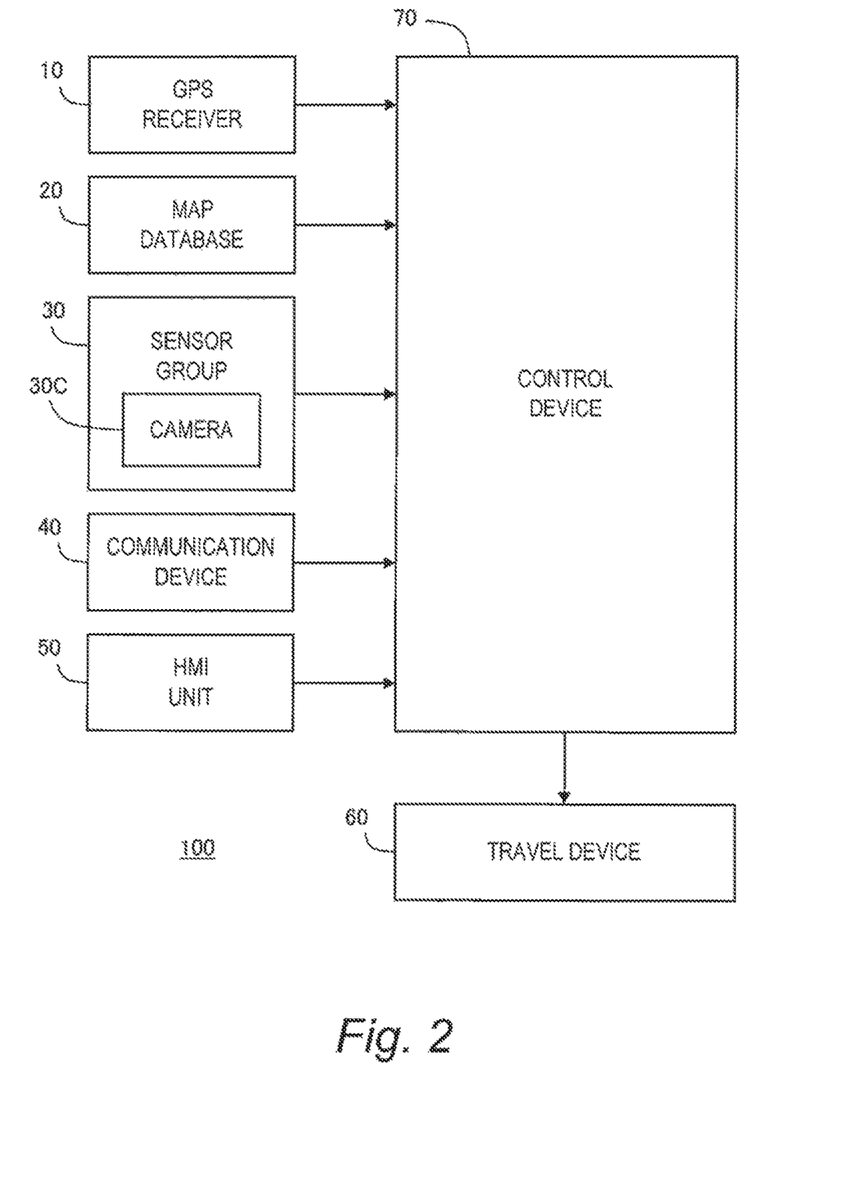
FIG. 2 is a block diagram showing a configuration example of the autonomous driving system according to the embodiment of the present disclosure.

FIG. 2 is a block diagram showing a configuration example of an autonomous driving system 100 according to the present embodiment. The autonomous driving system 100 is mounted on the vehicle 1 and controls the autonomous driving of the vehicle 1. More specifically, the autonomous driving system 100 is provided with a GPS (Global Positioning System) receiver 10, a map database 20, a sensor group 30, a communication device 40, an HMI (Human Machine Interface) unit 50, a travel device 60, and a control device 70.

The GPS receiver 10 receives signals transmitted from a plurality of GPS satellites and calculates a position and a posture (i.e. orientation) of the vehicle 1 based on the received signals. The GPS receiver 10 sends the calculated information to the control device 70.

Information indicating a boundary position of each lane on a map is beforehand recorded in the map database 20. For example, the boundary position of each lane is represented by a group of plural points or lines. Furthermore, information on a traffic rule at each position may be included in the map database 20. The map database 20 is stored in a predetermined storage device.

The sensor group 30 detects a situation around the vehicle 1, a travel state of the vehicle 1, a state of driver, and so forth. The sensor group 30 includes at least a camera 30C that images a situation around the vehicle 1. Besides, the sensor group 30 is exemplified by a LIDAR (Laser Imaging Detection and Ranging), a radar, a brightness sensor, a vehicle speed sensor, a driver monitor, and so forth. The LIDAR uses laser lights to detect a target around the vehicle 1. The radar uses radio waves to detect a target around the vehicle 1. The brightness sensor detects brightness at a position of the vehicle 1. The driver monitor detects the state of driver. The vehicle speed sensor detects a speed of the vehicle 1. The sensor group 30 sends the detected information to the control device 70.

The communication device 40 performs a V2X communication (i.e. a vehicle-to-vehicle communication and a vehicle-to-infrastructure communication). More specifically, the communication device 40 performs a V2V communication (a vehicle-to-vehicle communication) with another vehicle. In addition, the communication device 40 performs a V2I communication (a vehicle-to-infrastructure communication) with an external system (infrastructure). Through the V2X communication, the communication device 40 can acquire information on an environment around the vehicle 1. The communication device 40 sends the acquired information to the control device 70.

The HMI unit 50 is an interface for proving the driver with information and receiving information from the driver. For example, the HMI unit 50 includes an input device, a display device, a speaker, and a microphone. The input device is exemplified by a touch panel, a keyboard, a switch, and a button. By using the input device, the driver can input information to the HMI unit 50. The HMI unit 50 sends the information input by the driver to the control device 70.

The travel device 60 includes a steering device, a driving device, a braking device, a transmission, and so forth. The steering device turns wheels. The driving device is a power source that generates a driving force. The driving device is exemplified by an engine and an electric motor. The braking device generates a braking force.

The control device 70 performs autonomous driving control that controls the autonomous driving of the vehicle 1. Typically, the control device 70 is a microcomputer including a processor, a memory, and an input/output interface. The control device 70 is also called an ECU (Electronic Control Unit). The control device 70 receives a variety of information through the input/output interface. The control device 70 performs the autonomous driving control based on the received information. More specifically, the control device 70 creates a travel plan of the vehicle 1 and controls the travel device 60 so that the vehicle 1 travels according to the travel plan.

Figure 3:
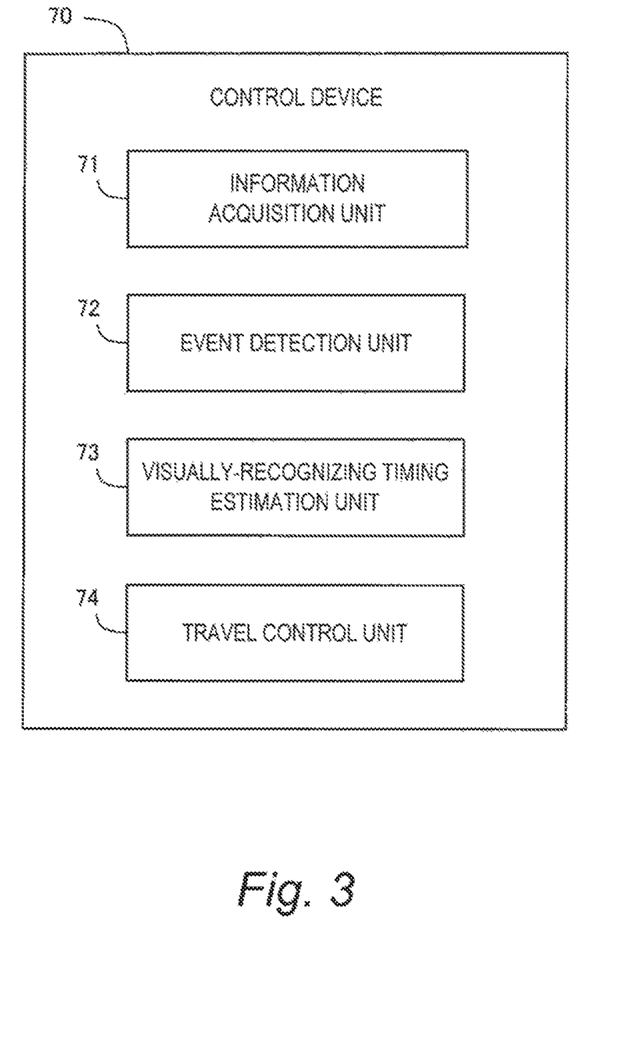
FIG. 3 is a block diagram showing a functional configuration example of a control device of the autonomous driving system according to the embodiment of the present disclosure.

FIG. 3 is a block diagram showing a functional configuration example of the control device 70 according to the present embodiment. The control device 70 includes, as functional blocks, an information acquisition unit 71, an event detection unit 72, a visually-recognizing timing estimation unit 73 and a travel control unit 74. These functional blocks are achieved by the processor of the control device 70 executing a control program stored in the memory. The control program may be recorded on a computer-readable recording medium.

The information acquisition unit 71 performs "information acquisition processing" that acquires information necessary for the autonomous driving control. The event detection unit 72, the visually-recognizing timing estimation unit 73, and the travel control unit 74 perform "autonomous driving control processing" that controls the autonomous driving of the vehicle 1. Hereinafter, each of the information acquisition processing and the autonomous driving control processing in the present embodiment be described in detail.

3. Information Acquisition Processing

Figure 4:
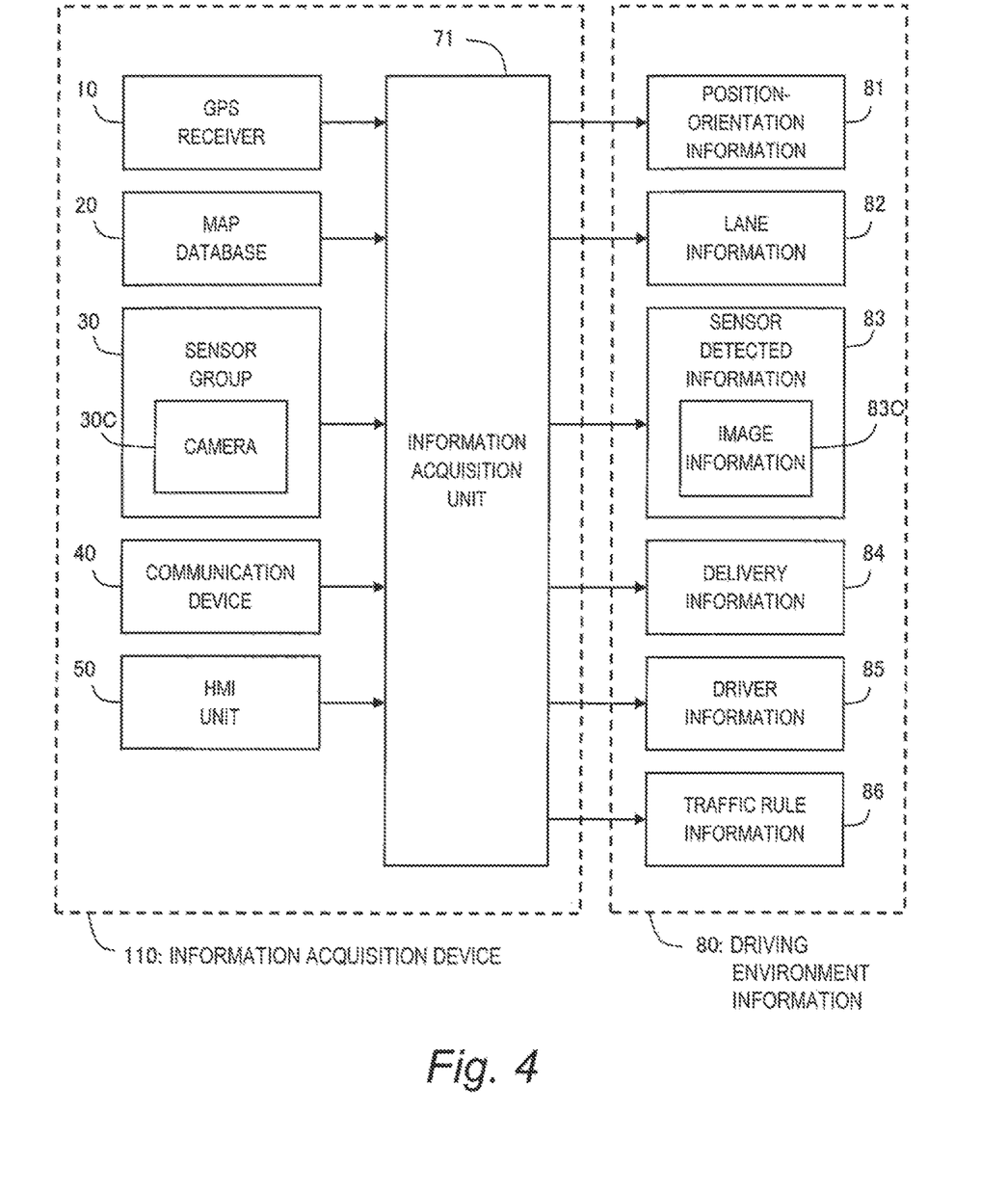
FIG. 4 is a block diagram for explaining information acquisition processing by the autonomous driving system according to the embodiment of the present disclosure.

FIG. 4 is a block diagram for explaining the information acquisition processing according to the present embodiment. In the information acquisition processing, the information acquisition unit 71 acquires information necessary for the autonomous driving control processing. The information acquisition processing is repeatedly executed every certain cycle.

More specifically, the information acquisition unit 71 acquires, from the GPS receiver 10, position-orientation information 81 indicating a current position and a posture (i.e. orientation) of the vehicle 1.

Moreover, the information acquisition unit 71 generates lane information 82 from the map database 20. The lane information 82 is information regarding lanes on the map. More specifically, the lane information 82 indicates a geometry (i.e. position, shape, and orientation) and an attribute (e.g. slower traffic lane, passing lane, and so forth) of each lane. Based on the lane information 82, it is possible to recognize lane attribute, lane increase, lane decrease, lane merging, lane branching, intersection, and the like.

Moreover, the information acquisition unit 71 generates sensor detected information 83 based on the information detected by the sensor group 30. For example, the sensor detected information 83 includes image information 83C imaged by the camera 30C. The image information 83C includes information on a surrounding vehicle, a traffic sign, a lane marking, and the like around the vehicle 1. Therefore, by performing an image analysis of the image information 83C by a well-known method, it is possible to recognize the surrounding vehicle, the traffic sign, the lane marking, and the like.

To be more general, the sensor detected information 83 includes target information regarding a target around the vehicle 1. The target around the vehicle 1 includes a moving target and a stationary target. The moving target is exemplified by a surrounding vehicle, a motorbike, a bicycle, a pedestrian, and so forth. Information regarding a moving target includes a position, a speed, and a size of the moving target. The stationary target is exemplified by a traffic sign, a lane marking, a roadside structure, an obstacle, and the like. Information regarding a stationary target includes a position and a size of the stationary target. Such the target information is generated based on the detected information obtained by the camera 30C, the LIDAR, the radar, and the like.

Furthermore, the sensor detected information 83 includes the vehicle speed detected by the vehicle speed sensor. In addition, the sensor detected information 83 may include the brightness detected by the brightness sensor. In addition, the sensor detected information 83 may include the state of driver detected by the driver monitor.

Moreover, the information acquisition unit 71 receives delivery information 84 through communication by the communication device 40. For example, the delivery information 84 is information delivered from a system (infrastructure) external to the vehicle 1. The delivery information 84 is exemplified by weather information, roadwork section information, accident information, traffic regulation information, and so forth.

Moreover, the information acquisition unit 71 receives driver information 85 through the HMI unit 50. The driver information 85 is exemplified by an age and driving experience of the driver. The driver information 85 may include a variety of settings selected by the driver. The driver can beforehand register the driver information 85 in the autonomous driving system 100 by using the input device of the HMI unit 50.

Moreover, the information acquisition unit 71 acquires traffic rule information 86. The traffic rule information 86 is information that indicates a traffic rule in relation to a position. For example, when the traffic rule together with the map is registered in the map database 20, the information acquisition unit 71 can acquire the traffic rule information 86 from the map database 20. Alternatively, when the system external to the vehicle 1 delivers the traffic rule information 86, the information acquisition unit 71 can acquire the traffic rule information 86 through the communication device 40.

All of the position-orientation information 81, the lane information 82, the sensor detected information 83, the image information 83C, the delivery information 84, the driver information 85, and the traffic rule information 86 as exemplified above indicate the driving environment for the vehicle 1. Information indicating such the driving environment for the vehicle 1 is hereinafter referred to as "driving environment information 80". That is to say, the driving environment information 80 includes the position-orientation information 81, the lane information 82, the sensor detected information 83, the image information 83C, the delivery information 84, the driver information 85, and the traffic rule information 86.

It can be said that the information acquisition unit 71 of the control device 70 has a function of acquiring the driving environment information 80. As shown in FIG. 4, the information acquisition unit 71 together with the GPS receiver 10, the map database 20, the sensor group 30, the communication device 40, and the HMI unit 50 constitute an "information acquisition device 110". The information acquisition device 110 as a part of the autonomous driving system 100 performs the information acquisition processing described above.

4. Autonomous Driving Control Processing

Figure 5:
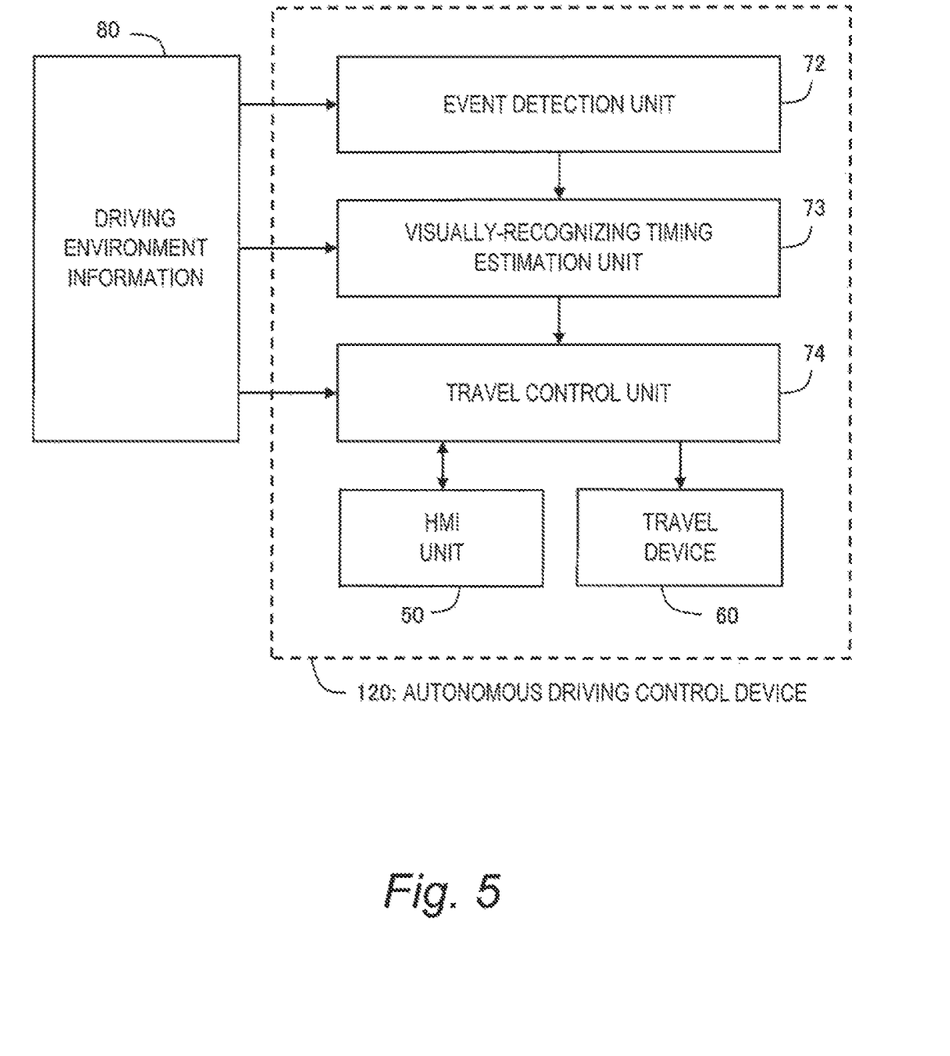
FIG. 5 is a block diagram for explaining autonomous driving control processing by the autonomous driving system according to the embodiment of the present disclosure.

FIG. 5 is a block diagram for explaining the autonomous driving control processing according to the present embodiment. As shown in FIG. 5, the event detection unit 72, the visually-recognizing timing estimation unit 73, the travel control unit 74, the HMI unit 50, and the travel device 60 constitute an "autonomous driving control device 120" that controls the autonomous driving of the vehicle 1. The autonomous driving control device 120 as a part of the autonomous driving system 100 performs the autonomous driving control processing based on the driving environment information 80 described above.

Figure 6:
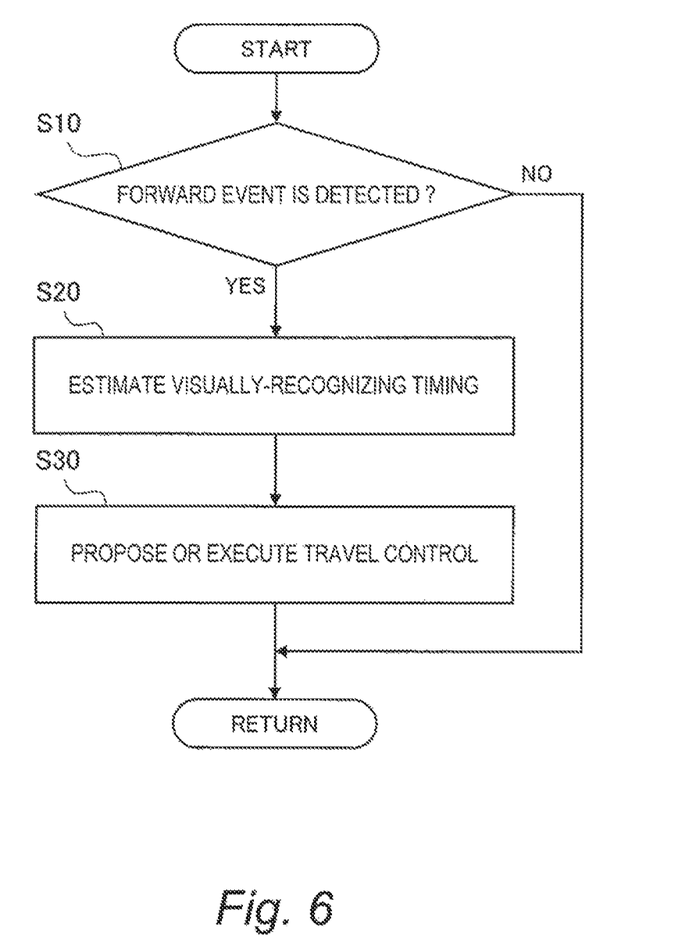
FIG. 6 is a flow chart showing the autonomous driving control processing according to the embodiment of the present disclosure.

FIG. 6 is a flow chart showing the autonomous driving control processing according to the present embodiment. The autonomous driving control processing according to the present embodiment will be described below with reference to FIGS. 5 and 6.

4-1. Event Detection Processing (Step S10)

The event detection unit 72 determines, based on the driving environment information 80, whether or not there is any forward event. That is, the event detection unit 72 performs detection of a forward event. Here, the "forward event" is an event that exists in front of the vehicle 1 and causes the autonomous driving control device 120 to perform travel control. The "travel control" is control that changes a travel state of the vehicle 1, and includes steering control, acceleration control, deceleration control, and blinker flashing.

Figure 7:
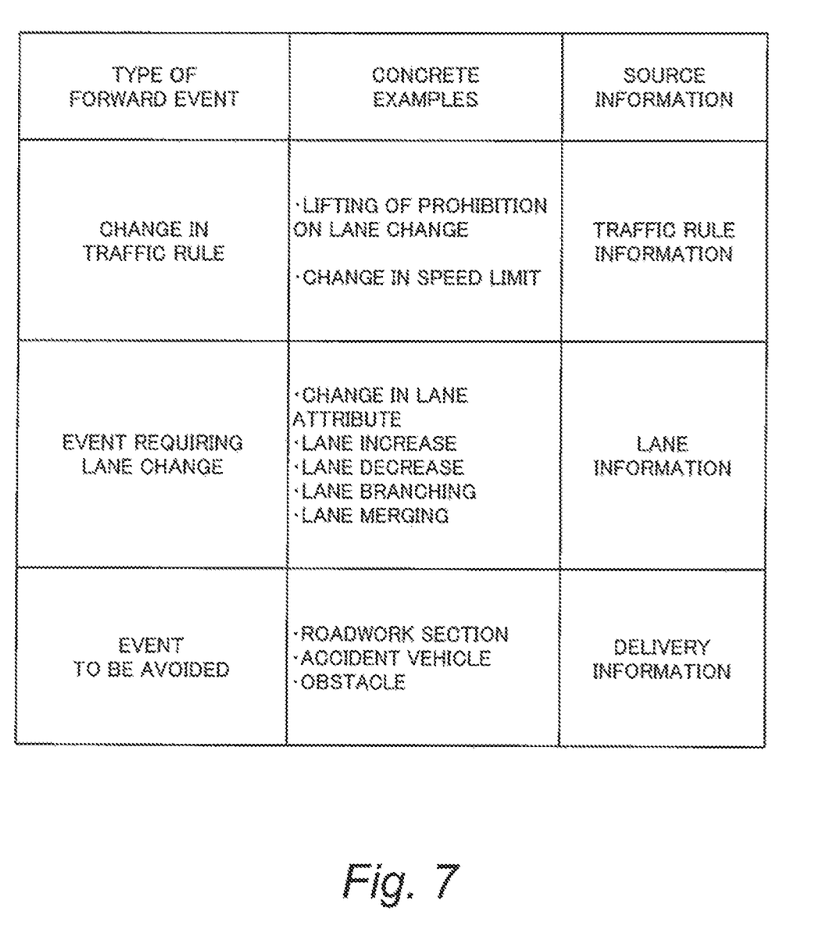
FIG. 7 is a conceptual diagram showing various examples of the forward event in the embodiment of the present disclosure.

FIG. 7 shows various examples of the forward event. For example, the forward event is change in traffic rule. The change in traffic rule is exemplified by lifting of prohibition on lane change, change in speed limit, and so forth. As the travel control in the case of the "lifting of prohibition on lane change", the steering control and/or the acceleration/deceleration control for making a lane change or the blinker flashing as a preliminary action of a lane change can be considered. As the travel control in the case of the "change in speed limit", the acceleration control or the deceleration control can be considered. Based on the traffic rule information 86, the event detection unit 72 is able to detect (recognize) such the change in traffic rule earlier than the driver.

Another example of the forward event is an event requiring lane change. One example of such the event is change in lane attribute. The lane attribute means classification (type) such as a slower traffic lane, a passing lane, and the like. In general, the autonomous driving system tends to keep away from the slower traffic lane and the passing lane and select a normal lane. Therefore, when the lane attribute changes in front of the vehicle 1, it may be necessary to make a lane change in advance. Besides, in cases of lane increase, lane decrease, lane branching, and lane merging, it may be necessary to make a lane change. The travel control in the case of the present example is the steering control and/or the acceleration/deceleration control for making a lane change or the blinker flashing as a preliminary action of a lime change. Based on the lane information 82, the event detection unit 72 is able to detect (recognize) these forward events earlier than the driver.

Still another example of the forward event is an event to be avoided. Such the event is exemplified by a roadwork section, an accident vehicle, an obstacle, and so forth. In order to avoid such the event, it is necessary to make a lane change in advance. Therefore, the travel control in the case of the present example is the steering control and/or the acceleration/deceleration control for making a lane change or the blinker flashing as a preliminary action of a lane change. Based on the delivery information 84 (specifically, the roadwork section information, the accident information, and the traffic regulation information), the event detection unit 72 is able to detect (recognize) these forward events earlier than the driver.

A content of the forward event is predetermined and recorded in the memory of the control device 70. Types of the forward event recorded can be plural. In that case, "detecting a forward event" means detecting at least one of the plural types of forward events. Based on the information recorded beforehand in the memory and the driving environment information 80, the event detection unit 72 can determine whether or not there is any forward event.

When the event detection unit 72 detects any forward event (Step S10; Yes), the processing proceeds to Step S20. On the other hand, when the event detection unit 72 detects no forward event (Step S10; No), the processing in the current cycle ends.

4-2. Visually-Recognizing Timing Estimation Processing (Step S20)

The visually-recognizing timing estimation unit 73 estimates the visually-recognizing timing TB at which the driver is able to visually-recognize the forward event detected at the above-described Step S10. Various examples can be considered as a policy of the estimation. Hereinafter, various examples of the estimation policy will be described.

4-2-1. First Example

In the example shown in FIG. 1, the traffic sign 3 and the change in lane marking 4 each indicates a change in traffic rule. The driver of the vehicle 1 recognizes the change in traffic rule by finding (i.e. visually-recognizing) the traffic sign 3 or the change in lane marking 4.

Meanwhile, the autonomous driving system 100 is provided with the camera 30C that optically images a situation around the vehicle 1. By performing an image analysis of the image information 83C imaged by the camera 30C, it is possible to recognize the traffic sign 3 and the change in lane marking 4. That is to say, the camera 30C of the autonomous driving system 100 is equivalent to eyes of the driver. Therefore, a timing at which the traffic sign 3 or the change in lane marking 4 is recognized based on the image information 83C is considered to be close to the visually-recognizing timing TB of the driver.

To further generalize the above viewpoint, let us define a term "item" indicating the forward event. The item is an object, a change, or a shape indicative of the forward event and is optically detectable. For example, in the case where the forward event is the "change in traffic rule (see FIG. 7)", the item is a traffic sign 3 or a change in lane marking 4 indicating the change in traffic rule. In the case where the forward event is the "event requiring lane change (see FIG. 7)", the item is a traffic sign 3, a change in lane marking 4, or a shape of lane marking 4 indicating the event such as the lane attribute, the lane branching, the lane merging, and so forth. In the case where the forward event is the "roadwork section", the item is a pylon, a sign and the like indicating the roadwork section. In the case where the forward event is the "accident vehicle" or the "obstacle" the item is the accident vehicle itself or the obstacle itself.

Based on the image information 83C imaged by the camera 30C, the visually-recognizing timing estimation unit 73 recognizes the item indicating the forward event. A timing at which the visually recognizing timing estimation unit 73 recognizes the item is hereinafter referred to as a "first timing". Since the camera 30C is equivalent to eyes of the driver as mentioned above, the first timing is close to the visually-recognizing timing TB of the driver. Therefore, the visually-recognizing timing estimation unit 73 regards (estimates) the first timing as the visually-recognizing timing TB.

4-2-2. Second Example

Although the autonomous driving system 100 is capable of recognizing a lot of targets at a time, the driver cannot recognize a lot of targets at a time. In some cases, the driver looks in a direction different from the forward event. Due to these reasons, the visually-recognizing timing TB tends to be delayed from the above-described first timing. Therefore, in the second example, a timing after the first timing is set (estimated) as the visually-recognizing timing TB.

Figure 8:
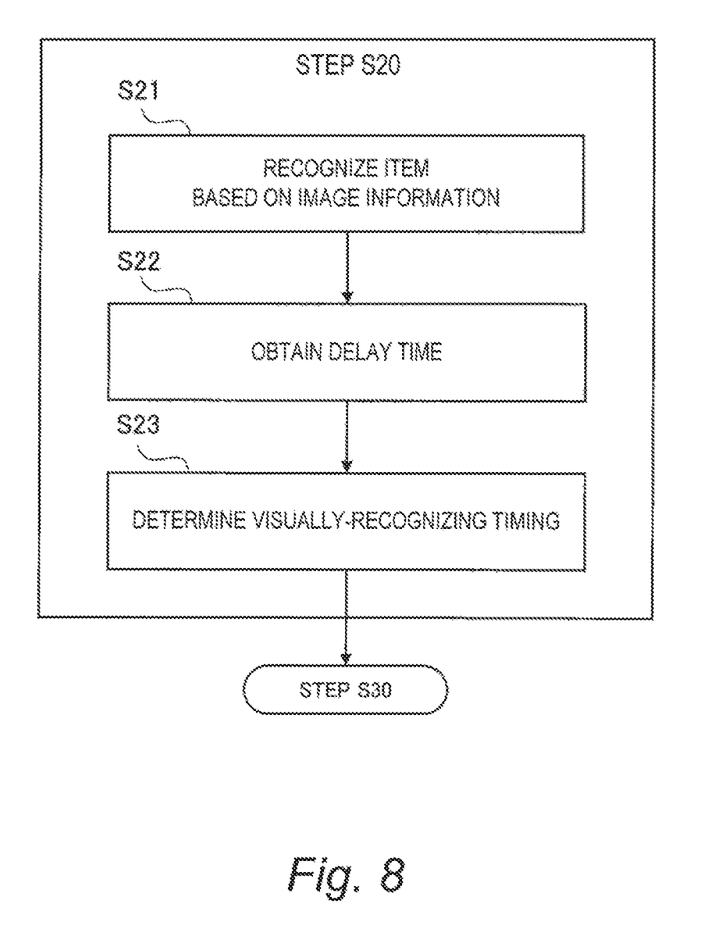
FIG. 8 is a flow chart showing an example of visually-recognizing timing estimation processing according to the embodiment of the present disclosure.

FIG. 8 is a flow chart showing the visually-recognizing timing estimation processing (Step S20) according to the second example. The visually-recognizing timing estimation unit 73 first recognizes the item indicating the forward event based on the image information 83C (Step S21). This Step S21 is the same as in the case of the above-described first example.

Subsequently, the visually-recognizing timing estimation unit 73 obtains a delay time (Step S22). For example, the delay time is a certain period of time. In this case, setting information indicating the certain period of time is beforehand recorded in the memory of the control device 70. The visually-recognizing timing estimation unit 73 reads the setting information from the memory to obtain the certain period of time.

The visually-recognizing timing estimation unit 73 determines (estimates), as the visually-recognizing timing TB, a timing after the first timing by the delay time (Step S23). According to the second example, the typical tendency of the visually-recognizing timing TB is taken into consideration, and thus accuracy of the visually-recognizing timing estimation processing is improved.

4-2-3. Third Example

In a third example, the delay time from the first timing to the visually-recognizing timing TB is not constant but variably set. As an example, let us consider a case where there is a lot of surrounding vehicles around the vehicle 1. In this case, there is a possibility that the driver is distracted by the surrounding vehicles and thus the timing to find the item is delayed. That is to say, the driving environment for the vehicle 1 affects the visually-recognizing timing TB. From this viewpoint, in the third example, the visually-recognizing timing estimation unit 73 variably sets the delay time in the above-described Step S22 according to the driving environment. As a result, the accuracy of the visually-recognizing timing estimation processing is further improved.

Figure 9:
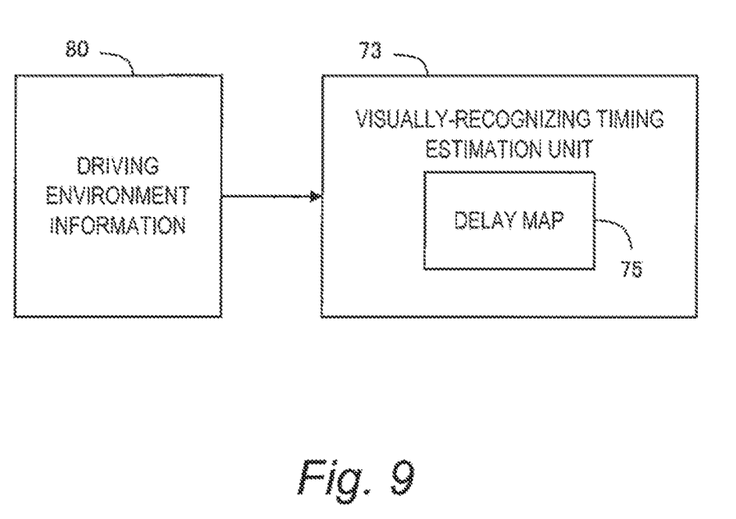
FIG. 9 is a block diagram for explaining another example of visually-recognizing timing estimation processing according to the embodiment of the present disclosure.

FIG. 9 is a block diagram for explaining the visually-recognizing timing estimation processing (Step S20) according to the third example. The visually-recognizing timing estimation unit 73 uses a delay map 75 to calculate the delay time (Step S22). The delay map 75 indicates a relationship between an input parameter and the delay time and is stored in the memory of the control device 70. The input parameter is a parameter indicating the driving environment acquired from the driving environment information 80. The visually-recognizing timing estimation unit 73 can obtain the delay time by using the driving environment information 80 and the delay map 75.

Figure 10:
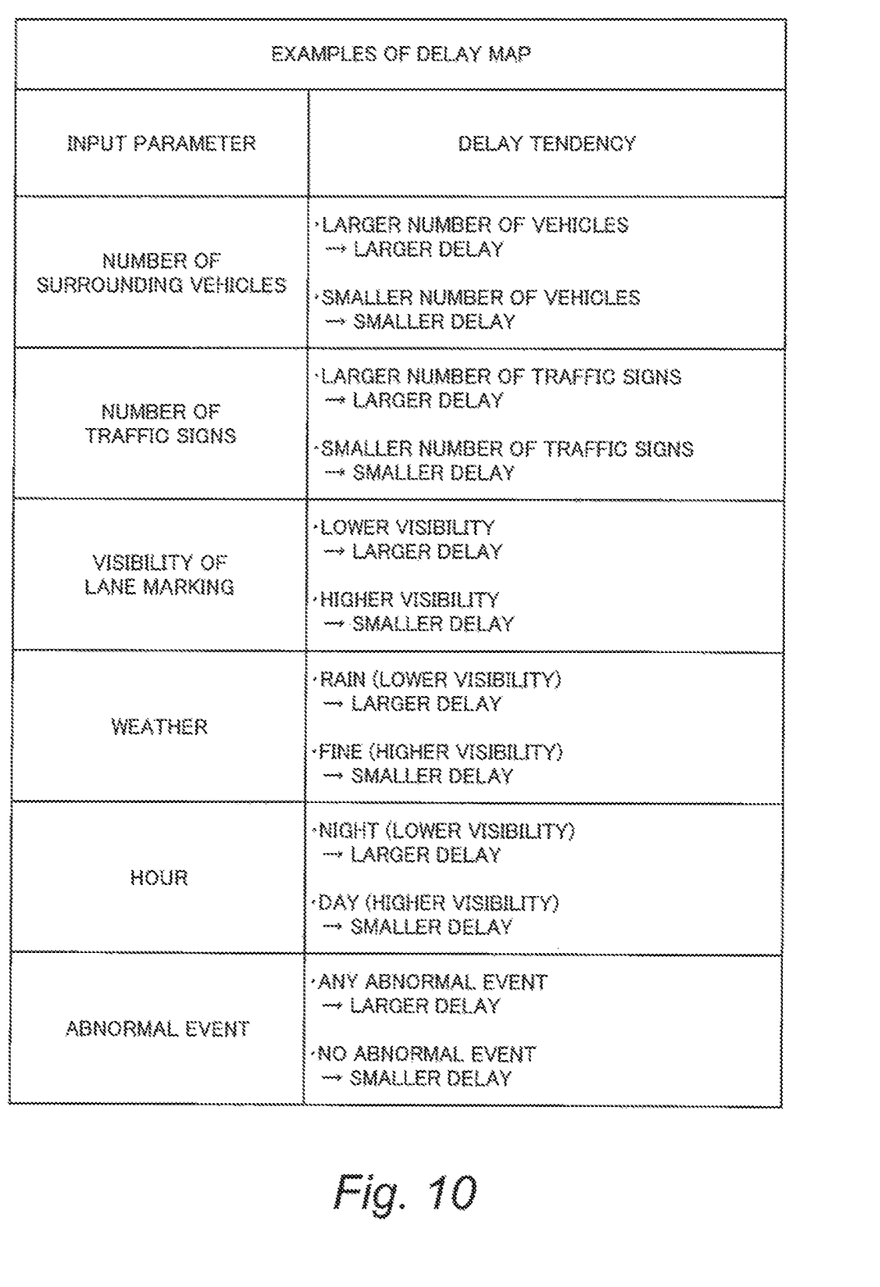
FIG. 10 is a conceptual diagram for explaining design examples of a delay map in the embodiment of the present disclosure.

FIG. 10 shows design examples of the delay map 75. The harder it is for the driver to find the item, the larger the delay time becomes. Ease of finding the item depends on the input parameter (i.e. the driving environment). FIG. 10 especially shows examples where the input parameter relates to external environments.

As an example, the input parameter is the "number of surrounding vehicles". Here the number of surrounding vehicles is the number of those existing in a certain range around the vehicle 1. The number of surrounding vehicles can be acquired from the sensor detected information 83. When the number of surrounding vehicles becomes larger, the driver needs to pay attention to respective behaviors of the surrounding vehicles, and thus the timing to find the item is delayed. Moreover, when the number of surrounding vehicles becomes larger, a blind spot increases and thus it becomes harder to check the surrounding situation. Therefore, the delay map 75 is designed such that the delay time increases as the number of surrounding vehicles becomes larger.

As another example, the input parameter is the "number of traffic signs 3". The number of traffic signs 3 can be acquired from the sensor detected information 83 (specifically, the image information 83C). The traffic signs 3 include ones unrelated to the forward event (e.g. the change in traffic rule). Therefore, when the number of traffic signs 3 becomes larger, it takes more time to find the traffic sign 3 indicating the forward event. Moreover, when the number of traffic signs 3 becomes larger, the driver is distracted by the traffic signs 3, and thus the timing to find the item other than the traffic sign 3 is delayed. Thereafter, the delay map 75 is designed such that the delay time increases as the number of traffic signs 3 becomes larger.

As still another example, the input parameter is "visibility of lane marking 4". The visibility of lane marking 4 can be acquired from the sensor detected information 83 (specifically, the image information 83C). For example, the visibility of lane marking 4 becomes lower as the lane marking 4 is more faded. When the visibility of lane marking 4 is low, it becomes hard for the driver to visually-recognize a change in the lane marking 4. Therefore, the delay map 75 is designed such that the delay time increases as the visibility becomes lower.

As still another example, the input parameter is "weather". The weather can be acquired from the delivery information 84 (specifically, the weather information) or the sensor detected information 83 (specifically, the brightness detected by the brightness sensor). Visibility is high when it is sunny or cloudy, while visibility is low in a case of rain or snow. When the visibility becomes low, it becomes hard for the driver to visually-recognize the item. Therefore, the delay map 75 is designed such that the delay time increases as the visibility becomes lower.

As still another example, the input parameter is "hour". The hour can be acquired from the drop information or the sensor detected information 83 (specifically, the brightness detected by the brightness sensor). Visibility is high during a daytime, while visibility is low at night. When the visibility becomes low, it becomes hard for the driver to visually-recognize the item. Therefore, the delay map 75 is designed such that the delay time increases as the visibility becomes lower.

As still another example, the input parameter is an "abnormal event". Here, the abnormal event means an event that does not exist usually. For example, the abnormal event includes a roadwork section, an accident vehicle, a failed vehicle, and so forth. Such the abnormal event can be acquired from the delivery information 84 (specifically, the roadwork section information, the accident information, and the traffic regulation information) or the sensor detected information 83. When there is any abnormal event, the driver is distracted by the abnormal event, and thus the timing to find the item is delayed. Therefore, the delay map 75 is designed such that the delay time increases when there is any abnormal event.

Figure 11:
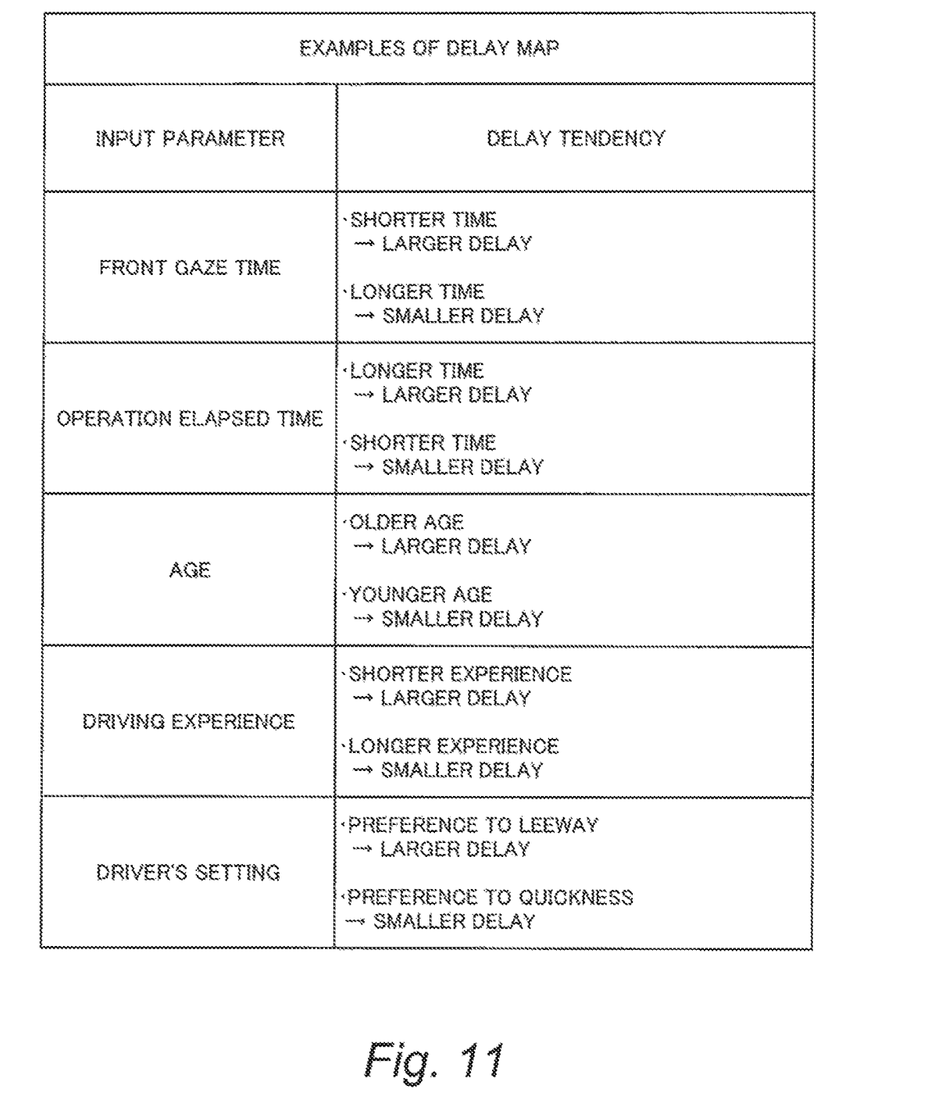
FIG. 11 is a conceptual diagram for explaining design examples of the delay map in the embodiment of the present disclosure.

FIG. 11 shows still other design examples of the delay map 75. FIG. 11 especially shows examples where the input parameter relates to internal environments.

As an example, the input parameter is a "front gaze time". Here, the front gaze time is an elapsed time since the driver faces forward. The front gaze time can be acquired from the sensor detected information 83 (specifically, the state of driver detected by the driver monitor). When the front gaze time is short, the driver has not yet fully recognized the forward situation, and thus the timing to find the item is delayed. Therefore, the delay map 75 is designed such that the delay time increases as the front gaze time becomes shorter.

As another example, the input parameter is an "operation elapsed time". Here, the operation elapsed time is an elapsed time since start of vehicle operation (i.e. engine start or travel start of the vehicle 1). The operation elapsed time can be acquired from internal information of the vehicle 1. As the operation elapsed time becomes longer, the driver's attention becomes more distracted, and thus the timing to find the item is delayed. Therefore, the delay map 75 is designed such that the delay time increases as the operation elapsed time becomes longer.

As still another example, the input parameter is an "age of the driver". The age of the driver can be acquired from the driver information 85. In a case of elderly people, a recognition speed is low and thus the timing to find the item is delayed. Therefore, the delay map 75 is designed such that the delay time increases as the age becomes older.

As still another example, the input parameter is "driving experience of the driver". The driving experience of the driver can be acquired from the driver information 85. When the driving experience is short, the time to recognize the surrounding situation tends to be long. Therefore, the delay map 75 is designed such that the delay time increases as the driving experience becomes shorter.

As still another example, the input parameter is "driver's setting". The driver's setting can be acquired from the driver information 85. The driver uses the HMI unit 50 to select either "preference to leeway" or "preference to quickness". The delay map 75 is designed such that the delay time becomes larger in the case of the "preference to leeway" while the delay time becomes smaller in the case of the "preference to quickness".

At least one of the input parameters exemplified above is used as the input parameter for the delay map 75. A combination of arbitrary plural input parameters may be used. It should be noted that the input parameter can be acquired at the first timing at the latest.

4-3. Travel Control Processing (Step S30)

The travel control unit 74 proposes or executes the travel control at or after the visually-recognizing tinning TB estimated at Step S20. As mentioned above, the travel control is control that changes the travel state of the vehicle 1 according to the forward event detected at Step S10. The travel control includes the steering control, the acceleration control, the deceleration control, and the blinker flashing.

The travel control unit 74 may propose or execute the travel control at the visually-recognizing timing TB. However, depending on a situation around the vehicle 1, there is a possibility that the travel control cannot be executed at the visually-recognizing timing TB. For example, when another vehicle exists beside the vehicle 1, it is not possible to immediately execute (start) a lane change. In that case, the travel control unit 74 executes the lane change after the visually-recognizing timing TB. What is important is to refrain from proposing or executing the travel control until the visually-recognizing timing TB.

When proposing the travel control to the driver, the travel control unit 74 uses the HMI unit 50. More specifically, the travel control unit 74 proposes the travel control to the driver through at least one of the display device and the speaker of the HMI unit 50. The driver approves or refuses the proposal by using at least one of the input device and the microphone of the HMI unit 50. When the driver approves the proposal, the travel control unit 74 executes the travel control.

When executing the travel control, the travel control unit 74 creates a travel plan (motion plan) of the vehicle 1. Then, the travel control unit 74 appropriately operates the travel device 60 such that the vehicle 1 travels according to the travel plan.

5. Summary

The driver (human) and the autonomous driving system 100 are different in all of the amount of information, speeds of recognition and judgement. As compared with the driver, the autonomous driving system 100 has more information and can recognize and judge faster. Taking such the difference into consideration, when detecting a forward event beforehand, the autonomous driving system 100 according to the present embodiment estimates the visually-recognizing timing TB at which the driver is able to visually-recognize the forward event. Then, at or after the estimated visually-recognizing timing TB, the autonomous driving system 100 proposes or executes travel control that changes the travel state according to the forward event. It is thus possible to reduce the driver's senses of strangeness and anxiety. This contributes to increase in confidence in the autonomous driving system 100.

What is claimed is:

1. An autonomous driving system comprising:
    a camera that images a situation around a vehicle; and
    an electronic control unit configured to:
        acquire driving environment information indicating a driving environment for the vehicle, the driving environment includes visibility that depends on weather or hour, the driving environment information includes image information imaged by the camera; and
        control autonomous driving of the vehicle based on the driving environment information,
    wherein a forward event is an event that exists in front of the vehicle and causes the electronic control unit to change a travel state of the vehicle,
    wherein the electronic control unit is configured to perform:
        event detection processing that detects the forward event based on the driving environment information;
        visually-recognizing timing estimation processing that estimates a visually-recognizing timing at which a driver of the vehicle is able to visually-recognize the forward event; and
        travel control processing that proposes or executes, at or after the visually-recognizing timing, travel control that changes the travel state according to the forward event,
    wherein the visually-recognizing timing estimation processing includes:
        processing that recognizes, based on the image information, an item indicating the forward event; and
        processing that regards a timing after a first timing when the item is recognized as the visually-recognizing timing,
    wherein the visually-recognizing timing is after the first timing by a delay time, and
    wherein the electronic control unit variably sets the delay time according to the driving environment such that delay time increases as the visibility becomes lower.

2. The autonomous driving system according to claim 1, wherein the driving environment information includes traffic rule information indicating a traffic rule in relation to a position, and the forward event includes change in the traffic rule that is detected based on the traffic rule information.

3. The autonomous driving system according to claim 1, wherein the driving environment information includes lane information regarding lanes on a map, and
the forward event includes at least one of change in lane attribute, lane increase, lane decrease, lane merging, and lane branching that are detected based on the lane information.

4. The autonomous driving system according to claim 1, wherein the driving environment information includes delivery information delivered from a system external to the vehicle, and
the forward event includes at least one of a roadwork section, an accident vehicle, and an obstacle that are detected based on the delivery information.

5. The autonomous driving system according to claim 1, wherein the visually-recognizing timing is after the first timing by a period of time based on setting information stored in the electronic control unit.

6. An autonomous driving system comprising:
a camera that images a situation around the vehicle; and
an electronic control unit configured to:
  acquire driving environment information indicating a driving environment for a vehicle, the driving environment includes a number of surrounding vehicles, the driving environment information includes image information imaged by the camera; and
  control autonomous driving of the vehicle based on the driving environment information,
wherein a forward event is an event that exists in front of the vehicle and causes the electronic control unit to change a travel state of the vehicle,
wherein the electronic control unit is configured to perform:
  event detection processing that detects the forward event based on the driving environment information;
  visually-recognizing timing estimation processing that estimates a visually-recognizing timing at which a driver of the vehicle is able to visually-recognize the forward event; and
  travel control processing that proposes or executes, at or after the visually-recognizing timing, travel control that changes the travel state according to the forward event,
wherein the visually-recognizing timing estimation processing includes:
  processing that recognizes, based on the image information, an item indicating the forward event; and
  processing that regards a timing after a first timing when the item is recognized as the visually-recognizing timing,
wherein the visually-recognizing timing is after the first timing by a delay time,
wherein the electronic control unit variably sets the delay time according to the driving environment such that the delay time increases as the number of surrounding vehicles becomes larger.

7. A method comprising:
capturing image information, by a camera, to image a situation around a vehicle;
acquiring, by an electronic control unit, driving environment information indicating a driving environment for a vehicle, the driving environment information includes the image information, the driving environment includes visibility that depends on weather or hour;
controlling, by the electronic control unit, autonomous driving of the vehicle based on the driving environment information;
detecting, by the electronic control unit, a forward event based on the driving environment information, the forward event is an event that exists in front of the vehicle and causes the electronic control unit to change a travel state of the vehicle;
estimating, by the electronic control unit, a visually-recognizing timing at which a driver of the vehicle is able to visually-recognize the forward event by:
  recognizing, by the electronic control unit, an item indicating the forward event based on the image information, and
  processing, by the electronic control unit, that regards a timing after a first timing when the item is recognized as the visually-recognizing timing; and
executing, by the electronic control unit, travel control that changes the travel state of the vehicle according to the forward event at or after the visually-recognizing timing,
  wherein the visually-recognizing timing is after the first timing by a delay time, and
  wherein the delay time is variably set according to the driving environment such that the delay time increases as the visibility becomes lower.

8. The method of claim 7, wherein the driving environment information includes traffic rule information indicating a traffic rule in relation to a position, and
the forward event includes change in the traffic rule that is detected based on the traffic rule information.

9. The method of claim 7, wherein the driving environment information includes lane information regarding lanes on a map, and
the forward event includes at least one of change in lane attribute, lane increase, lane decrease, lane merging, and lane branching that are detected based on the lane information.

10. The method of claim 7, wherein the driving environment information includes delivery information delivered from a system external to the vehicle, and
the forward event includes at least one of a roadwork section, an accident vehicle, and an obstacle that are detected based on the delivery information.

11. The method of claim 7, wherein the visually-recognizing time is after the first timing by a period of time based on setting information stored in the electronic control unit.

* * * * *

UNITED STATES PATENT AND TRADEMARK OFFICE
CERTIFICATE OF CORRECTION

PATENT NO. : 10,761,540 B2  
APPLICATION NO. : 15/824674  
DATED : September 1, 2020  
INVENTOR(S) : Ryuta Hashimoto and Yoshinori Watanabe Page 1 of 1

It is certified that error appears in the above-identified patent and that said Letters Patent is hereby corrected as shown below:

In the Specification

In Column 1, Line 67, delete "m" and insert --in--, therefor.

In Column 4, Line 41, delete "ride" and insert --rule--, therefor.

In Column 6, Line 45, delete "proving" and insert --providing--, therefor.

In Column 7, Line 9, after "73", insert --,--.

In Column 10, Line 49, after ""obstacle"", insert --,--.

In Column 10, Line 54, delete "visually recognizing" and insert --visually-recognizing--, therefor.

In Column 11, Line 60, after "Here", insert --,--.

In Column 12, Line 40, delete "drop" and insert --time--, therefor.

In Column 13, Line 45, delete "tinning" and insert --timing--, therefor.

Signed and Sealed this  
Fifth Day of January, 2021

Andrei Iancu  
*Director of the United States Patent and Trademark Office*